(12) United States Patent
Müller et al.

(10) Patent No.: US 9,107,432 B2
(45) Date of Patent: Aug. 18, 2015

(54) LOW TEMPERATURE MOGUL METHOD

(75) Inventors: Rolf Müller, Schweiz (CH); Federico Innerebner, Schweiz (CH)

(73) Assignee: InnoGEL AG, Hunenberg (CH)

( * ) Notice: Subject to any disclaimer, the term of this patent is extended or adjusted under 35 U.S.C. 154(b) by 931 days.

(21) Appl. No.: 12/299,619

(22) PCT Filed: May 2, 2007

(86) PCT No.: PCT/CH2007/000213
§ 371 (c)(1),
(2), (4) Date: Nov. 5, 2008

(87) PCT Pub. No.: WO2007/128150
PCT Pub. Date: Nov. 15, 2007

(65) Prior Publication Data
US 2009/0068333 A1     Mar. 12, 2009

(30) Foreign Application Priority Data
May 5, 2006   (DE) .................. 10 2006 021 280

(51) Int. Cl.
A23G 3/42   (2006.01)
A23G 3/34   (2006.01)

(52) U.S. Cl.
CPC ............. *A23G 3/42* (2013.01); *A23G 3/0025* (2013.01)

(58) Field of Classification Search
USPC .............. 426/549, 573, 661, 512, 519, 520
See application file for complete search history.

(56) References Cited

U.S. PATENT DOCUMENTS

| | | | |
|---|---|---|---|
| 3,218,177 A | 11/1965 | Robinson et at | |
| 3,687,690 A * | 8/1972 | Moore | 426/537 |
| 3,940,505 A | 2/1976 | Nappen et al. | |
| 4,704,293 A * | 11/1987 | Moore et al. | 426/573 |
| 4,726,957 A | 2/1988 | Lacourse et al. | |
| 4,886,678 A | 12/1989 | Chiu et al. | |
| 4,948,615 A | 8/1990 | Zallie et al. | |
| 5,262,191 A | 11/1993 | Chakraborty et al. | |
| 6,432,422 B1 * | 8/2002 | Yasukawa et al. | 424/401 |
| 2005/0163833 A1 | 7/2005 | Muller | |
| 2006/0004193 A1 | 1/2006 | Muller et al. | |
| 2006/0013940 A1 | 1/2006 | Muller et al. | |
| 2006/0134311 A1 | 6/2006 | Mueller et al. | |
| 2006/0222766 A1 | 10/2006 | Muller et al. | |
| 2009/0275531 A1 | 11/2009 | Muller et al. | |

FOREIGN PATENT DOCUMENTS

| | | | | |
|---|---|---|---|---|
| DE | 541340 | 1/1932 | | |
| EP | 0360046 | 3/1990 | | |
| EP | 0 885 568 A1 | 12/1998 | | |
| EP | 1 023 841 A1 | 8/2000 | | |
| EP | 1 342 417 A1 | 9/2003 | | |
| WO | WO 00/44241 | 8/2000 | | |
| WO | WO0241702 | * 5/2002 | ............. | A23G 9/02 |
| WO | WO 03/035026 A2 | 5/2003 | | |
| WO | WO 03/035045 A1 | 5/2003 | | |
| WO | 2005/079819 A1 | 9/2005 | | |
| WO | WO 2007/014484 A1 | 2/2007 | | |

OTHER PUBLICATIONS

Fennema's Food Chemistry 4th Edition, CRC PRess 2008, p. 121.*
McHugh, Dennis "A guide to the seaweed industry" FAO Fisheries Technical Paper 441, pp. 61-63, 2003.*
Martin Scott Cardinali and Tak Yu (Fiona) Lam, New Advances in Starch-Based Particle Technologies for Aesthetic Modification, *National Starch PersonalCare*, Mar. 2003, Bridgewater, New Jersey, U.S.A.

* cited by examiner

*Primary Examiner* — Kelly Bekker
(74) *Attorney, Agent, or Firm* — Amy Allen Hinson; John B. Hardaway, III; Nexsen Pruet, LLC

(57) ABSTRACT

The invention relates to a novel Mogul procedure for manufacturing sweets, in particular starch-based gummi candies, which have a comparable texture to gelatin-based gummi candies, with at least one portion of the starch not being completely dissolved until after the pouring into the form of the confection article. In comparison to previous Mogul technology, the casting mass is poured at a comparatively low temperature, and the gelling and/or settling occurs at a comparatively high temperature.

11 Claims, No Drawings

LOW TEMPERATURE MOGUL METHOD

BRIEF DESCRIPTION

The invention describes a new method for manufacturing cast rubber-like confectionery articles, in particular rubber-like products based on starch. The products that can be manufactured with them can also be obtained with a texture very much resembling the typical rubbery elastic texture of gelatins, without necessarily having to use gelatins for this purpose.

Another range of confectionery articles is manufactured using the popular Mogul technology. A mixture that typically exhibits the components sugar, texturing substances, water and additives (fragrances, acids, dyes, etc.) is here prepared in a hot, liquid state for casting the molds using the Mogul system. The casting compound is here a homogeneous solution, i.e., the components are uniformly mixed together, in particular, the texturing substances are dissolved and homogeneously distributed in the casting compound. The viscosity of the casting compound must here be sufficiently low to ensure pourability, and typically measures around <1 Pas.

After casting in starch powder molds, the cast article is hardened via cooling, gel formation and reduction of water content through diffusion in the starch powder. Typical sugars include saccharose, polyols and syrups made of liquefied and saccharified starch. The most important texturing substances are gelatins, pectins, gum Arabic and hydrolyzed starch.

Reference is made to the following standard works with respect to prior art: "Sugar confectionery manufacture", E. B. Jackson, ed., Blackie A&P (1995); "The science of sugar confectionery", W. P. Edwards, RSC (2000); "Sugar and confectioneries", Hoffman/Mauch/Untze, Behr's (2002). Rubber products based on starch are described in U.S. Pat. No. 4,726,957, U.S. Pat. Nos. 5,262,191 and 3,218,177. EP 1,342,417 A1, EP 1,023,841 A1 and WO 00/44241 describe solutions for gelatin substitution in the area of confectioneries. As outlined above, all cited patent specifications involve first manufacturing a mixture or solution, wherein all components are finally dissolved and homogeneously mixed. This homogeneous compound is then formed into the product, after which gelling is initiated by reducing the temperature.

SUMMARY OF THE INVENTION

It was determined that rubber-like confectionery can be extensively manufactured that is comparable with rubber-like confectionery based on gelatins by using retrogradation-stable, long-chained starch in place of gelatins. The hydrolyzed, or short-chained, starches used in the area of confectioneries cannot be used to achieve such rubbery elastic properties. In order to achieve a sufficiently high level of rubber elasticity, substantial portions of the long-chain starch are required, which increases the viscosity of the casting compound to such an extent that the compound can no longer be poured. It is a known phenomenon that the viscosity rises disproportionately to the size of the molecules. In typical recipes based on long-chained starch, viscosities are therefore reached that are at least 5 to 10 times higher than 1 Pas, which designates an upper limit relative to the pourability. As a result, such recipes could previously not be processed with Mogul technology.

However, the present invention surprisingly provided a way for recipes even containing high quantities of long-chained starch, which generates viscosities of up to 100 Pas or more in a dissolves state, can still be obtained and poured with low viscosity. In order to achieve this, the starch was given a form here referred to as particulate starch. This is a powder of starch particles that are preferably as compact as possible, and soluble in the liquid phase of the confectionery (sugar, glucose syrup, water). Before adding the particulate starch, the viscosity is very low, since higher molecular components are absent, so that the liquid phase can be processed very well with the Mogul technology. After adding the particulate starch, the viscosity is initially only raised to a slight extent, since the particulate starch is suspended in the liquid phase. In this state, the particulate starch has not yet dissolved in the liquid phase, thus still enabling a very effective processing by means of Mogul technology. Only once the particulate starch begins to dissolve does the viscosity of the mixture of the liquid phase and starch increase, and only then can the long-chain starch macromolecules exert their effect relative to a massive viscosity increase. But if molding already took place before that point, the rise in viscosity is no longer problematical. In order to end up with a homogeneously poured product, it is necessary that the particulate starch be preferably completely dissolved or swelled. Therefore, the homogeneous mixture only arises after the molding and not before, as is customary in traditional Mogul technology. It was found that the time window for processing the mixture from a liquid phase and particulate starch and the period for dissolving the particulate starch after molding until achieving complete homogenization can be influenced by several parameters, such as temperature, size, type and composition of particles in the particulate starch, and optimized for the requirements of various types of Mogul systems.

The present invention essentially describes a method of how recipes that correspond to typical recipes of the kind described in WO 2004/056192 of the same applicant and enable typical rubbery elastic textures can be processed using Mogul technology, while corresponding textures in WO 2004/056192 can be processed via extrusion, since they are too highly viscous for the pouring process. The disclosure of WO 2004/056192 is hereby included.

The invention described here is also of importance relative to the following applications of the same applicant, the disclosure of which is hereby include in this application: WO 2003/035026, WO 2003/035044, WO 2003/035045, WO 2004/085482, WO 2004/085482, WO 2004/085482, WO 2004/091770, WO 2004/085483, WO 2004/023890 and PCT/CH2006/000409.

DETAILED DESCRIPTION

Particulate Starch

In the following, the invention will be described based on particulate starch. However, it is not limited to starch, and other hydrocolloids can also be used, provided these can be preferentially converted into a specifically soluble particle form, and the conditions described below relating to particle size, softener content, water content, hydrocolloids, structure, form, state and manufacture are satisfied. Most important here are the parameters of grain size, amorphous structure and glass transition point conditions.

Particle size. The smaller the average particle size of the particulate starch, the faster the particulate starch dissolves, and the shorter the time window after mixing the particulate starch in the liquid phase. If the particle size is too big, there is no longer solubility, or the dissolution process takes too long, and the homogeneity of the products is impaired. The average particle size ranges from 1 to 500 micrometers. In a preferred embodiment, the particle size of the particulate starch in the micrometer range measures from 5 to 300, preferably 5 to 200, more preferably 10 to 150, and most preferably 20 to 150.

Starch. The particulate starch exhibits at least one long-chained starch. Long-chained implies a molecular weight of starches lying in the range of conventional native starches. The dextrose equivalent of the long-chained starch ranges from 0 to 10. In a preferred embodiment, the dextrose equivalent ranges from 0 to 7, preferably 0 to 5, more preferably 0 to 3, and most preferably 0 to 2.

The long-chained starch exhibits a slight to negligible tendency toward retrogradation. It can be native or modified. In terms of origin, tapioca starches are especially preferred. The amylose content of the long-chained starch in % w/w measures <30. In a preferred embodiment, the amylose content measures <25, preferably <20, more preferably <15, and most preferably <10. Waxy starches can also be used. With respect to modification, use can be made of substituted starches like acetylated, hydroxypropylated, hydroxyethylated, phosphorylated, oxidized, oxidized-acetylated starch, as well as the corresponding chemically cross-linked starches (e.g., distarch phosphate, distarch adipate).

Softener content. The higher the share of softener in the particulate starch, the faster the dissolution process takes place. The softener can also be used to influence the time window available for processing and subsequent dissolution. In addition, softeners like glycerin and sorbitol can be components of the recipe, and can then optionally be incorporated via the particulate starch or the liquid phase, wherein the liquid phase exhibits a reduced viscosity in this case, thereby expanding the time window for processing. The softener content of the particulate starch in % w/w ranges from 0 to 70. In a preferred embodiment, this value measures 0 to 40, preferably 0 to 30, more preferably 0 to 20, and most preferably 0 to 15. The specified ranges apply individually to each separate softener. Potential softeners include the softeners known for starch, in particular glycerin, sorbitol and other polyols, as well as oligosaccharides, sugar and sugar types.

Water content. Water is the most efficient softener for starch, and acts in a uniform manner. The water content should be low enough for the particulate starch to be present in a frozen state. The lower the water content, the longer the time window for processing the suspension. The water content of the particulate starch in % w/w ranges from 0 to 25. In a preferred embodiment, the water content ranges from 1 to 25, preferably 1.5 to 20, more preferably 2 to 15, and most preferably 2.5 to 11.

Hydrocolloids. The particulate starch can exhibit hydrocolloids, which make it possible to modify their dissolution behavior along with the product texture. The required share of starch can also be influenced or reduced. Possible hydrocolloids include agar, carrageenan, xanthan, gellan, galactomannans, gum Arabic, tragacanth, karaya, curdian, beta glucan, alginates, mannans, chitosan, celluloses, proteins, pectins, starch (non-long-chained starch, e.g., hydrolyzed and/or oxidized starch). The share of hydrocolloid in % w/w ranges from 0 to 70. In a preferred embodiment, the share ranges from 0 to 50, preferably 0 to 30, more preferably 0 to 20, and most preferably 0 to 15. These data apply individually for each individual hydrocolloid.

Short-chained starch. The particulate starches can exhibit short-chained starch. A short-chained starch is understood as a starch with an average polymerization degree of 15 to 100, preferably 15 to 50, more preferably 15 to 30, and most preferably 15 to 25. The short-chained starch can preferably be crystallized and/or is substantially linear or branched. It yields networks with the long-chained starch via hetercrystallization, thereby additionally contributing to rubbery elasticity. The share of short-chained starch in % w/w relative to the particulate starch then ranges from 0 to 50. In a preferred embodiment, this share ranges from 1 to 40, preferably 2 to 30, more preferably 2 to 20, and most preferably 2 to 15.

Structure. The state of the long-chained starch and potentially the short-chained starch and the hydrocolloids within the particles of the particulate starch is at least partially amorphous, preferably substantially amorphous. An amorphous states is a precondition for dissolution in the liquid phase, when the component is insoluble therein in a crystalline form, as is most often the case. This condition means that the particulate starch is used in a delayed-instantaneously soluble form.

Form. The form of particulate starch has a distinct influence on the processing window. Given the same nominal grain size, a spherical geometry yields a longer processing window in comparison to a platelet or splinter form. This is why as spherical and compact a geometry is preferred. A compact form is manifested in a high apparent density. At an average grain size of >50 micrometers, the apparent density in $g/cm^3$ >0.5, preferably >0.55, and most preferably >0.60. At an average grain size of >85 micrometers, the apparent density is >65, preferably >70, and most preferably >75.

State. The glass transition point in ° C. for the particulate starch measures >0. In a preferred embodiment, this temperature measures >15, preferably >25, more preferably >45, and most preferably >60. As a result of this condition, the particulate starch is present in a frozen state, so that the structure is stable, and no gelling or networking takes place that would impede the subsequent dissolution process. In addition, the particulate starch can be very effectively milled, and good handling is ensured (no stickiness, no clumping).

Manufacture. The particulate starch or components contained therein are generally prepared in a process that ensures the establishment of the defined structure and delivers the desired grain size and form. For example, this is accomplished by dissolution, gelatinization or plasticizing the starch(es), and if necessary the hydrocolloids. This can then be combined with spray drying, roller drying or extrusion. Various milling methods can be used to adjust or modify the particle size. Extrusion is preferred, since it can be used to obtain preferred compact particles of particulate starch.

Overall Recipe

The overall mixture, meaning the overall recipe, is composed of a liquid phase and particulate starch. The liquid phase substantially contains all components, with the exception of the particulate component, wherein this component can exhibit shares of water, softener or other hydrocolloids as the long-chained starch. Therefore, the liquid phase can exhibit any composition that is used for pouring confectionery, with the only difference relative to the method described here essentially being that the structure-forming component is first absent. Hence, the liquid phase typically exhibits sugar, water, acid, fragrance and dye, and use is made of the entire range of these and similar substances sufficiently known to the expert. Any confectionery corresponding to prior art, including variations and specialties, is hereby included relative to all aspects of the products.

Water content. The water content of the overall recipe in % w/w at the time of the casting process ranges from 15 to 50. In a preferred embodiment, this share ranges from 17 to 45, preferably 19 to 37, more preferably 21 to 35, and most preferably 23 to 33.

Share of long-chained starch. The share of long-chained starch in % w/w relative to the anhydrous overall recipe ranges from 5 to 60. In a preferred embodiment, this share ranges from 5 to 45, preferably 5 to 40, more preferably 6 to 35, and most preferably 7 to 31.

Share of particulate starch. The share of particulate starch in % w/w relative to the anhydrous overall recipe ranges from 7 to 70. In a preferred embodiment, this share ranges from 9 to 55, preferably 11 to 45, more preferably 11 to 40, and most preferably 13 to 35.

Share of additional hydrocolloids. The share of additional hydrocolloids (including non-long-chained starch and short-chained starch) in % w/w relative to the anhydrous overall recipe ranges from 0 to 20. In a preferred embodiment, this share ranges from 0 to 15, preferably 0 to 10, more preferably 0 to 7, and most preferably 0 to 5. Such hydrocolloids can be used to modify the textural properties. The can be introduced via the particulate starch or dissolved via the liquid phase.

Softener content. The share of softener in % w/w relative to the anhydrous overall recipe ranges from 0 to 30. In a preferred embodiment, this share ranges from 0.5 to 20, preferably 1 to 15, more preferably 1.5 to 15, and most preferably 2 to 10. The indicated ranges apply individually to each individual softener. They can be used as moisture-retaining agents, to modify texture, for processing capability (dissolving the particulate starch) and for organoleptic properties.

Water content of product. The water content at the time of product packaging in % w/w relative to the overall recipe ranges from 4 to 25. In a preferred embodiment, this share ranges from 5 to 22, preferably 6 to 20, more preferably 7 to 18, and most preferably 8 to 15.

Modified Methods

Conventional Mogul systems can be used to manufacture confectionery products based on particulate starch on a large scale. The central difference lies in the fact that, by comparison to conventional Mogul technology, where casting temperatures ranging from 60 to 100° C. are used, the temperature of the casting compound is reduced while pouring. The casting temperature in ° C. ranges form –20 to 90. In a preferred embodiment, this temperature range from –5 to 90, more preferably –3 to 70, and most preferably –2 to 50. Therefore, Mogul suspensions based on particulate starch are poured at a comparatively lower temperature. Rubber articles based on conventional gelling agents, e.g., gelatins or pecans, are stored after pouring at moderate temperatures of below 40° C., since gelling sets in at low temperatures. In confectionery based on particulate starch, the situation is reversed in this case too. Comparatively high temperatures can be used during gelling and storage. These temperatures in ° C. range from 15 to 70. In a preferred embodiment, it ranges from 20 to 65, more preferably 25 to 60, and most preferably 28 to 55. High gelling and storage temperatures are advantageous, since the gelling or storage times can hereby be reduced, thereby accelerating the process.

Since the time window for processing is limited once the particulate starch has been mixed in with the liquid phase, the standard procedure can be modified as follows:

1. The Mogul suspension is stored in a storage tank that feeds the Mogul system under conditions where the dissolution or swelling either does not take place or does so very slowly, so that a virtually constant state remains in place over a longer period of typically 1 h. This is achieved by reducing the water content by a standard 29% and/or the temperature. The dissolution of particulate starch is then initiated via the temperature rise during or after pouring. For example, a recipe with 25% particulate starch with a grain size of 100-140 micrometers and 25% water content at 13° C. could be obtained for one hour at a constant viscosity. If such a mixture is poured in starch powder molds, the particulate starch dissolves in 4 at 35° C., in 3 h at 40° C., in 2 h at 45° C., and in 1.5 h at 50° C. If the grain size is increased, a stable suspension can also already be obtained at higher temperatures or higher water contents. Suitable conditions can hence be set through a selected combination of grain size, composition of particulate starch (e.g., polyol content), water content, temperature and viscosity of the liquid phase. Tables 1 and 2 provide information about advantageous combinations.
2. In another variant, a Mogul suspension that remains stable for about 1 hour is achieved via a low water content of <29%, preferably <25%, most preferably <22%. This suspension is metered into the Mogul system, during which several % of additional water are mixed in, so that the resultant mixture dissolves or swell sufficiently at the gelling and storage temperatures mentioned above.
3. Combinations of variants 1 and 2 are conceivable.
4. Another possibility would be to meter the fluid phase into the Mogul system and continuously mix in the particulate starch.
5. In Mogul systems equipped with an intermediate storage, the volume of which is processed within a short period of about 20 min at most, the finished casting compound can be set to temperatures in the intermediate storage ranging from about 20 to 40° C., and the particulate starch optimal for this purpose can be sued to obtain a sufficiently long processing window (compare Tables 1 and 2).

EXAMPLES

Example 1

Pourability of Mogul Suspensions with 25% Particulate Starch

Table 1 shows the corresponding time windows for pourability for a selection of recipes. It clearly shows the influence of temperature, grain size of the particulate starch, water content of the overall mixture, sugar:glucose ratio, type of glucose, acid content, and share of additional glycerin (not incorporated as a component of the particulate starch).

In % w/w, the particulate starch (PK1#1) had a water content of 9.9, a glycerin content of 8 and a share of short-chained starch (average molecular weight roughly 23) of 10. To manufacture the particulate starch, a hydroxypropylated distarch phosphate based on tapioca was plasticized in an extruder, mixed with dissolved short-chained starch and glycerin, discharged through perforated dies with a 1 mm diameter at a bulk temperature of 125° C. and granulated. The product exhibited a water content of 10% w/w, and was present in a compact, amorphous state. It could be obtained in various grain sizes using a mill and via subsequent screen fractionating.

The manufacture of the Mogul suspensions is described by example for the recipe M26.1:28.40 g sugar solution (7 parts sugar in 3 parts water) was mixed with 37.24 g glucose syrup C*Sweet 01656 (8 parts oligosaccharide in 2 parts water) and 10 g water, in which 2 g citric acid was dissolved, wherein this solution exhibited 34.3% w/w water. Of this, 20 g was mixed with 4.86 particulate starch PK 1#7, so that the mixture exhibited a water content of 29.6% w/w and a 25% w/w share of long-chained starch relative to the dry overall recipe. The zero point for determining the duration of pourability was defined as the time when the particulate starch was mixed into the solution. This was followed by evacuation to remove air pockets. The pourability was evaluated by pouring a molding in the form of a gummi bear into starch powder at different times.

Example 2

Dissolution Behavior of Suspensions with 25% Particulate Starch

The Mogul suspensions were manufactured as described in Example 1 with the same particulate starch (PK 1#7). The dissolution or swelling behavior was evaluated with a light microscope. The particles in the particulate starch could be observed very well, and became smaller and smaller over time, until finally disappearing entirely. The influence of grain size, temperature and water content of the overall mixture are presented on Table 2.

Example 3

Modifications

Table 3 presents recipes and their properties, which show the influence of the share of particulate starch in a range of 15 to 30% on the one hand, and the influence of additional polysaccharides like xanthan and oxidized, acetylated starch on the other hand, which can be introduced in both the dissolved state via the liquid phase and in the solid (amorphous) state via the particulate starch. In all recipes, the sugar:glucose ratio was 2:3, the water content during pouring was about 29.6%, and 1% citric acid and 1% sodium citrate were used. The Mogul samples were stored at 43% atmospheric humidity for 2 days, then demolded and stored further at 43% atmospheric humidity, wherein water contents of 11.5 to 12.5% set in.

TABLE 1

Pourability

| No. | Temp. [° C.] | Grain size of PC [μm] | Water in overall mixture [%] | Sugar:glucose [ ] | Glucose syrup [ ] | Acid [%] | Pourability [min] | Additional glycerin [%] |
| --- | --- | --- | --- | --- | --- | --- | --- | --- |
| M25-1 | 13 | 50-70 | 21.7 | 4:6 | C*Sweet 1656 | 0 | ≥240 | 0 |
| M25-2 | 13 | 70-100 | 21.7 | 4:6 | C*Sweet 1656 | 0 | ≥240 | 0 |
| M25-3 | 13 | 50-70 | 23.8 | 4:6 | C*Sweet 1656 | 0 | ≥240 | 0 |
| M25-4 | 13 | 70-100 | 23.8 | 4:6 | C*Sweet 1656 | 0 | ≥240 | 0 |
| M25-5 | 13 | 50-70 | 25.9 | 4:6 | C*Sweet 1656 | 0 | 120 | 0 |
| M25-6 | 13 | 70-100 | 25.9 | 4:6 | C*Sweet 1656 | 0 | 240 | 0 |
| M25-1 | 18 | 50-70 | 21.7 | 4:6 | C*Sweet 1656 | 0 | ≥240 | 0 |
| M25-2 | 18 | 70-100 | 21.7 | 4:6 | C*Sweet 1656 | 0 | ≥1 d | 0 |
| M25-3 | 18 | 50-70 | 23.8 | 4:6 | C*Sweet 1656 | 0 | 120 | 0 |
| M25-4 | 18 | 70-100 | 23.8 | 4:6 | C*Sweet 1656 | 0 | ≥240 | 0 |
| M25-5 | 18 | 50-70 | 25.9 | 4:6 | C*Sweet 1656 | 0 | 75 | 0 |
| M25-6 | 18 | 70-100 | 25.9 | 4:6 | C*Sweet 1656 | 0 | ≥240 | 0 |
| M25-1 | 25 | 50-70 | 21.7 | 4:6 | C*Sweet 1656 | 0 | 120 | 0 |
| M25-2 | 25 | 70-100 | 21.7 | 4:6 | C*Sweet 1656 | 0 | ≥240 | 0 |
| M25-3 | 25 | 50-70 | 23.8 | 4:6 | C*Sweet 1656 | 0 | 90 | 0 |
| M25-4 | 25 | 70-100 | 23.8 | 4:6 | C*Sweet 1656 | 0 | 120 | 0 |
| M25-5 | 25 | 50-70 | 25.9 | 4:6 | C*Sweet 1656 | 0 | 15 | 0 |
| M25-6 | 25 | 70-100 | 25.9 | 4:6 | C*Sweet 1656 | 0 | 45 | 0 |
| M26-1 | 13 | 50-70 | 29.6 | 4:6 | C*Sweet 1656 | 2.7 | 15 | 0 |
| M26-2 | 13 | 70-100 | 29.6 | 4:6 | C*Sweet 1656 | 2.7 | 35 | 0 |
| M26-1 | 25 | 50-70 | 29.6 | 4:6 | C*Sweet 1656 | 2.7 | 7 | 0 |
| M26-2 | 25 | 70-100 | 29.6 | 4:6 | C*Sweet 1656 | 2.7 | 9 | 0 |
| M26-1 | 30 | 50-70 | 29.6 | 4:6 | C*Sweet 1656 | 2.7 | 6.5 | 0 |
| M26-2 | 30 | 70-100 | 29.6 | 4:6 | C*Sweet 1656 | 2.7 | 8 | 0 |
| M27-2 | 35 | 100-140 | 29.6 | 4:6 | C*Sweet 1656 | 2.7 | 8 | 0 |
| M27-3 | 35 | 140-200 | 29.6 | 4:6 | C*Sweet 1656 | 2.7 | 12 | 0 |
| M27-1 | 25 | 80-100 | 29.6 | 4:6 | C*Sweet 1656 | 2.7 | 11 | 0 |
| M27-2 | 25 | 100-140 | 29.6 | 4:6 | C*Sweet 1656 | 2.7 | 15 | 0 |
| M27-3 | 25 | 140-200 | 29.6 | 4:6 | C*Sweet 1656 | 2.7 | 20 | 0 |
| M27-4 | 25 | 200-300 | 29.6 | 4:6 | C*Sweet 1656 | 2.7 | 25 | 0 |
| M27-1 | 35 | 80-100 | 29.6 | 4:6 | C*Sweet 1656 | 2.7 | 4 | 0 |
| M27-2 | 35 | 100-140 | 29.6 | 4:6 | C*Sweet 1656 | 2.7 | 7 | 0 |
| M27-3 | 35 | 140-200 | 29.6 | 4:6 | C*Sweet 1656 | 2.7 | 10 | 0 |
| M29-3 | 35 | 200-300 | 29.6 | 4:6 | BC Sweet 1535 | 2.7 | 15 | 0 |
| M29-4 | 40 | 200-300 | 29.6 | 4:6 | BC Sweet 1535 | 2.7 | 10 | 0 |
| M31-1 | 25 | 100-140 | 28.0 | 4:6 | BC Sweet 1535 | 2.7 | 22 | 0 |
| M31-2 | 25 | 100-140 | 26.5 | 4:6 | BC Sweet 1535 | 2.7 | 30 | 0 |
| M31-3 | 25 | 100-140 | 25.0 | 4:6 | BC Sweet 1535 | 2.7 | 40 | 0 |
| M31-1 | 35 | 100-140 | 28.0 | 4:6 | BC Sweet 1535 | 2.7 | 12 | 0 |
| M31-2 | 35 | 100-140 | 26.5 | 4:6 | BC Sweet 1535 | 2.7 | 16 | 0 |
| M31-3 | 35 | 100-140 | 25.0 | 4:6 | BC Sweet 1535 | 2.7 | 20 | 0 |
| M31-4 | 35 | 140-200 | 28.0 | 4:6 | BC Sweet 1535 | 2.7 | 15 | 0 |
| M31-5 | 35 | 140-200 | 26.5 | 4:6 | BC Sweet 1535 | 2.7 | 18 | 0 |
| M31-6 | 35 | 140-200 | 25.0 | 4:6 | BC Sweet 1535 | 2.7 | 25 | 0 |
| M32-1 | 35 | 100-140 | 29.6 | 4:6 | C*Sweet 1656 | 2.7 | 6 | 0 |
| M32-2 | 35 | 100-140 | 28.0 | 4:6 | C*Sweet 1656 | 2.7 | 12 | 0 |
| M32-3 | 35 | 100-140 | 26.5 | 4:6 | C*Sweet 1656 | 2.7 | 16 | 0 |
| M32-4 | 35 | 100-140 | 29.6 | 1:2 | BC Sweet 1535 | 2.7 | 9 | 0 |

TABLE 1-continued

| | | | Pourability | | | | | |
|---|---|---|---|---|---|---|---|---|
| No. | Temp. [° C.] | Grain size of PC [μm] | Water in overall mixture [%] | Sugar:glucose [ ] | Glucose syrup [ ] | Acid [%] | Pourability [min] | Additional glycerin [%] |
| M32-5 | 35 | 100-140 | 28.0 | 1:2 | BC Sweet 1535 | 2.7 | 14 | 0 |
| M32-6 | 35 | 100-140 | 26.5 | 1:2 | BC Sweet 1535 | 2.7 | 18 | 0 |
| M33-1 | 35 | 100-140 | 29.6 | 4:6 | BC Sweet 1535 | 2.7 | 8 | 2 |
| M33-2 | 35 | 100-140 | 28.0 | 4:6 | BC Sweet 1535 | 2.7 | 12 | 2 |
| M34-1 | 35 | 100-140 | 26.5 | 4:6 | BC Sweet 1535 | 2.7 | 10 | 4 |
| M34-2 | 35 | 100-140 | 28.0 | 4:6 | BC Sweet 1535 | 2.7 | 15 | 4 |

TABLE 2

| Dissolution behavior | | | | | | | |
|---|---|---|---|---|---|---|---|
| Water content of overall mixture [%] | 29.5 | 29.6 | 29.6 | 29.6 | 25.0 | 26.5 | 28.0 |
| Grain size of PS [μm] | 80-100 | 100-140 | 140-200 | 200-300 | 100-140 | 100-140 | 100-140 |
| Temp. [° C.] / Time [min] | Dissolution of particulate starch (PS) [%] | | | | | | |
| 25 / 15 | 10 | 10 | 5 | 0 | 0 | 0 | 0 |
| 25 / 30 | 25 | 20 | 10 | 0 | 0 | 0 | 5 |
| 25 / 60 | 50 | 40 | 15 | 0 | 0 | 5 | 10 |
| 25 / 90 | 70 | 60 | 20 | 0 | 5 | 10 | 20 |
| 25 / 120 | 85 | 65 | 30 | 5 | 5 | 15 | 25 |
| 25 / 150 | 95 | 65 | 35 | 5 | 10 | 20 | 40 |
| 25 / 180 | 100 | 70 | 40 | 10 | 10 | 25 | 50 |
| 25 / 210 | | 75 | 45 | 10 | 10 | 30 | 60 |
| 25 / 240 | | 75 | 50 | 10 | | 35 | 65 |
| 25 / 270 | | 80 | 55 | 10 | | 40 | 70 |
| 25 / 300 | | 80 | 60 | 15 | | 45 | 70 |
| 25 / 330 | | 85 | 65 | 15 | | 50 | 75 |
| 25 / 360 | | 90 | 70 | 20 | | | 75 |
| 25 / 390 | | 90 | 70 | 25 | | | 80 |
| 25 / 420 | | 90 | 70 | 25 | | | 80 |
| 25 / 24 h | | 100 | 100 | 70 | | | |
| 30 / 15 | 60 | 30 | 20 | 0 | 5 | 10 | 15 |
| 30 / 30 | 70 | 50 | 45 | 5 | 5 | 15 | 25 |
| 30 / 60 | 90 | 75 | 60 | 10 | 15 | 30 | 45 |
| 30 / 90 | 100 | 85 | 75 | 15 | 25 | 40 | 60 |
| 30 / 120 | | 95 | 80 | 30 | 35 | 50 | 70 |
| 30 / 150 | | 100 | 85 | 40 | 45 | 60 | 80 |
| 30 / 180 | | | 90 | 50 | 50 | 70 | 90 |
| 30 / 210 | | | 95 | 55 | 60 | 75 | 95 |
| 30 / 240 | | | 95 | 60 | 65 | 80 | 95 |
| 30 / 270 | | | 95 | | | 85 | 100 |
| 30 / 300 | | | 95 | | | 85 | |
| 30 / 330 | | | 95 | | | 90 | |
| 30 / 360 | | | 100 | | | | |
| 30 / 24 h | | | | 95 | | | |
| 40 / 15 | 80 | 60 | 50 | 20 | 20 | 30 | 50 |
| 40 / 30 | 90 | 85 | 80 | 40 | 30 | 50 | 60 |
| 40 / 45 | 100 | 90 | 85 | 50 | 40 | 60 | 70 |
| 40 / 60 | | 95 | 90 | 60 | 50 | 70 | 80 |
| 40 / 75 | | 100 | 95 | 65 | 55 | 80 | 85 |
| 40 / 90 | | | 95 | 70 | 60 | 85 | 90 |
| 40 / 105 | | | 95 | 75 | 65 | 85 | 90 |
| 40 / 120 | | | 100 | 80 | 70 | 90 | 95 |
| 40 / 150 | | | | 85 | 80 | 95 | 100 |
| 40 / 180 | | | | 90 | 85 | 100 | |
| 40 / 240 | | | | 95 | 95 | | |
| 40 / 24 h | | | | 100 | | | |
| 50 / 15 | 90 | 90 | 80 | 70 | 70 | 80 | 85 |
| 50 / 30 | 100 | 95 | 90 | 85 | 80 | 85 | 90 |
| 50 / 45 | | 100 | 95 | 90 | 85 | 90 | 95 |
| 50 / 60 | | | 100 | 95 | 90 | 95 | 100 |
| 50 / 75 | | | | | 95 | 95 | 100 |
| 50 / 90 | | | | | 100 | 100 | |

TABLE 3

| No. | PS 2) [%] | PS [Typ] | Grain size [μm] | Modification | Evaluation |
|---|---|---|---|---|---|
| M 19-3 | 15 | PK1#7 | 70-100 | None | Softer than M19-2 |
| M 19-2 | 20 | PK1#7 | 50-70 | None | Typical texture of starch-gelatin mixture |
| M 19-1 | 25 | PK1#7 | 50-70 | None | Typical texture of gelatin gummi bonbon (soft) |
| M 11-2 | 30 | PK1#7 | 70-100 | None | Typical texture of gelatin gummi bonbon (hard) |
| M 22-1 | 25 | PK1#7 | 50-70 | 1% starch 1) in liquid phase | Slightly more solid than M19-1 |
| M 22-2 | 25 | PK1#7 | 50-70 | 3% starch 1) in liquid phase | Slightly more solid than M22-1 |
| M 22-3 | 25 | PK1#7 | 50-70 | 5% starch 1) in liquid phase | Slightly more solid than M22-2 |
| M 21-1 | 25 | PG10 | 50-70 | 2% xanthan in particulate phase | Elevated rubbery elasticity relative to M19-1 |
| M 21-3 | 25 | PG11 | 50-70 | 4% xanthan in particulate phase | Elevated rubbery elasticity relative to M21-1 |
| M 23-5 | 25 | PK1#7 | 70-100 | 0.1% xanthan in liquid phase | Elevated rubbery elasticity relative to M19-1 |
| M 23-6 | 25 | PK1#7 | 70-100 | 0.2% xanthan in liquid phase | Elevated rubbery elasticity relative to M19-1 |

1) Starch = oxidized and acetylated thin-boiling potato starch, share relative to dry overall recipe
2) Content of particulate starch relative to dry overall recipe
PK1#7: 9.9% H2O, 8% glycerin, 10% short-chained starch
PG10: 5.8% H2O, 0% glycerin, 0% short-chained starch, 2% xanthan
PG10: 5.5% H2O, 0% glycerin, 0% short-chained starch, 4% xanthan

The invention claimed is:

1. A casting method for manufacturing confectionery articles, comprising casting said confectionary articles using a casting compound comprising a liquid phase and a particulate starch suspended in the liquid phase, wherein said particulate starch will dissolve or swell in the cast compound after the confectionery articles have been cast; wherein the particulate starch comprises a long-chained starch exhibiting a dextrose equivalent within a range of 0 to 10; wherein the particulate starch comprises a powder of starch particles obtained by dissolution, gelatinization or plastification of a starch or a mixture comprising at least one starch; wherein the casting compound is essentially free of additional hydrocolloids besides the particulate starch; and wherein a homogenous mixture of the casting compound only arises after the molding.

2. The casting method according to claim 1, wherein the particulate starch in the form of substantially amorphous particles is mixed in with the liquid phase.

3. The casting method according to claim 2, wherein the glass transition point of the substantially amorphous particles measures >0° C.

4. The casting method according to claim 1 wherein the particulate starch is mixed in with the liquid phase with an average particle size ranging from 1 to 500 micrometers.

5. The casting method according to claim 1, wherein the long-chained starch is retrogradation stable.

6. The casting according to claim 1 wherein the share of long-chained starch in % w/w ranges from 5 to 60 relative to the dry overall casting compound.

7. The casting method according to claim 1 wherein the casting compound exhibits a temperature in ° C. ranging from −20 to 90 at the time of casting.

8. The casting method according to claim 1, wherein the confectionery articles comprise a gelatin-like rubber elastic texture.

9. The casting method according to claim 1, wherein the casting compound is essentially free of short-chained starch having an average polymerization degree of 15 to 100.

10. The casting method according to claim 1, wherein the snare of particulate starch in % w/w relative to the anhydrous overall recipe of the casting compound ranges from 1 to 35.

11. The casting method according to claim 1, wherein said particulate starch will completely dissolve or swell in the cast compound after the confectionery articles have been cast.

* * * * *